Aug. 13, 1940.  H. H. BLOUNT  2,210,969

TREE MOVER DEVICE

Filed Oct. 4, 1937

FIG. 1

FIG. 2

INVENTOR.
HOBART H. BLOUNT.

BY Lockwood Goldsmith & Galt
ATTORNEYS.

Patented Aug. 13, 1940

2,210,969

UNITED STATES PATENT OFFICE 2,210,969

TREE MOVER DEVICE

Hobart H. Blount, Indianapolis, Ind., assignor of one-third to Ovid G. Ottinger, Muncie, Ind., and one-third to Hiram M. Engledow, Indianapolis, Ind.

Application October 4, 1937, Serial No. 167,111

5 Claims. (Cl. 214—3)

This invention relates to a tree mover device.

The chief object of this invention is to provide a device which may be readily moved into position to receive a tree for facilitating the tilting of a tree so it may be readily transported from one location to another and then repositioned for transplanting.

Another object of this invention is to provide a tree mover structure which is so arranged that parts thereof may be readily detached or associated together as desired, so that the main portion may be moved as a trailer arrangement in either direction.

Another object of the invention is to provide a tree mover device with parts which are detachably associated together so that the device may be moved from location to location as required, with a minimum overall length, and also with a minimum required headroom clearance.

The chief feature of the invention consists in providing a wheeled carriage or main frame which has a bent portion and a boom portion, the two being positioned substantially at right angles to each other, and associating therewith for transportation purposes, a fore-carriage either directly associated with the boom forwardly thereof or indirectly associated with the boom through the instrumentality of a supplemental frame structure and rearward thereof, in both instances the boom being positioned approximately parallel to the ground.

Various other objects and features will appear more fully hereinafter, reference being had to the following description.

The full nature of the invention will be understood from the accompanying drawing and the following description and claims.

In the drawing, Fig. 1 is a perspective view of the main wheeled frame structure embodying the bent and boom associated with an auxiliary frame arrangement for towing and provided with a bracing frame structure for bracing a tree operatively secured to the foregoing.

Fig. 2 is a perspective view of the forecarriage which may be connected to either the free end of the boom or the free end of the connected supplemental frame for tree transportation.

In the drawing 10 indicates the trunk of a tree, 11 the root system including the earth associated therewith, the same being enclosed by a suitable covering, such as burlap 12 and the like, and secured about the root system and earth by suitable retaining means as the cords or wires 13.

The main wheeled frame includes a main axle structure 14 to which is secured a suitable cross member structure 15, from which projects in converging relation, a pair of angles 16, the same being connected together by an angle member 17. Extending therefrom, are the convergingly directed angle members 18 which have their ends secured by bolts 19, or the like, to a tongue structure 20, the latter serving as a boom. There is also secured remote from the free end of the tongue and to the angle members 18, a cross member or bearing plate 21. There is also secured between the same and main cross member structure 15 of the main frame, another angle member 22. The rearward end of the tongue is suitably secured as at 23 to a pair of spaced angles 24 suitably secured to the cross member 17 and the cross member structure 15. This constitutes, briefly, the boom structure aforesaid.

To the forward or free end of the boom is suitably secured a clevis 25. Also adjacent thereto is secured a second clevis 26, the purpose of each being hereinafter set forth more specifically.

Suitably secured as at 30 to the free end of the boom is a coupling member 27 which includes two spaced bearings 28 and suitably apertured, the apertures being in alignment to receive the main portion of an angular pin 29.

The bent structure is of dual character being formed of four angle irons 31 suitably secured to the cross member structure 15 and diagonally braced as at 32 and transversely connected as at 33 and 34, the latter transverse connections being near the top of the bent structure and supporting the cradle 35 which is adapted to support the tree trunk 10 immediately adjacent the root system.

A pair of divergingly directed and inclined brace members 36 are suitably secured to the bent structure at one end and to the boom structure at the opposite end and are connected intermediate their ends by the cross member 37, the latter being connected to the cross member 22 by the members 38.

The frame members 16 are elongated as at 39 and each is provided with a pivotal support 40 for a supplementary frame structure, including the two rearwardly and convergingly directed angle or channel members, as desired, 41, the latter being pivotally supported at 42 on the pivotal support 40 and suitably and lockingly secured thereto, the locking being effected when horizontally positioned.

The members 41 are secured in spaced relation near the pivotal supported portions by a member not shown. A pair of members 43 positioned in spaced relation is associated with the forward end of the tongue 44. The aforesaid supplementary frame structure terminates in a member or coupling 45 which has spaced bearings 46 in alignment and apertured to receive an angular pin 47. Portions 45 and 27 are similar and pins 47 and 29 are similar.

The supplementary frame adjacent member 45, has secured to it a transverse member 48. A truncated, triangular brace structure, indicated generally by numeral 49, has a portion 50 associated with member 48 for support purposes. The opposite end 51 is positioned adjacent the root system and associated earth, and the latter is suitably supported by the bracing frame unit 49—50—51 by cradle forming chains, cables, or the like, 79, shown herein, connected at their lower ends to member 15 and/or axle 14.

It is to be understood the padding, which may comprise a rubber sheet or pad, usually is interposed between the cradle and the tree trunk 10, but in this illustration the same has been omitted solely for clearness.

The trunk has secured to it adjacent the root system, a clamping base 52 and chains and draw bolts 53 and 54, respectively, encircle the trunk, bearing on the bearing portions or wooden blocks 55, in turn bearing on a padded arrangement 56. A chain 57 is connected to the base 52, as shown, and to the clevis 25. A cable or like structure 58 encircles the trunk 10 more remote from the root system, such encircling engagement being protected by padding 59 and this cable 58 is associated with the boom structure as at 60 between the two clevises 25 and 26.

A towing frame or fore carriage—see Fig. 2—includes an axle 61 and a pair of angle members 62 suitably secured thereto at one end and secured at the opposite ends to a plate 63 having an apertured end 64, the members 62 being cross braced as at 65. The axle 61 supports the wheels 66 and intermediate the wheels supports a member 67 which rotatably mounts a structure 68 having a projecting end 69 provided with an opening 70 therethrough.

The fore-carriage structure may be positioned forwardly of the member 27 or rearwardly of the member 45 and the spaced bearings 28 or 46, respectively, associated with member 69 and the pin 29 or 47, respectively, pivotally unite the same together. When the fore-carriage is positioned forwardly of the boom, the vehicle can be moved in the direction to the right. When positioned rearwardly thereof and connected to member 45, the entire structure can be moved to the left. This, however, does not prevent the entire tree mover device from being moved in either opposite directions when the fore-carriage is so connected, respectively.

For an understanding of the invention, the following description of operation will be set forth.

It is assumed a tree is to be moved from one location to another. Guy wires are applied to the tree for safety. An annular channel is dug around the selected tree, to define the root system area. When this is completed and the channel is undercut sufficiently, the burlap or covering is applied and secured to the root system with the included earth. Then the combination boom and bent is backed into position the fore-carriage being at that time connected to coupling 27. When thus positioned, the fore-carriage is disengaged and removed. The combination boom and bent structure is tilted substantially 90° from its original and travelling position, and the cradle is placed against the tree trunk immediately adjacent the root system. The clamp structure 52 to 56, inclusive, is then applied. The chain 57 and cable 58 are then applied. The guy wires are then removed.

Power is then applied to the clevis 26 to draw downwardly the boom and tree trunk, this being a progressive operation during which the unsevered root system is completely severed from that remaining in the ground which previously has supported the tree. The boom is then held in the substantially horizontal position, the supplementary frame is attached to the combination boom and bent structure, the brace frame is associated with the supplementary frame and root system for bracing purposes, and the chains 79 are applied for additional root system support.

The fore-carriage is then connected to the coupling 45 and the hole from which the root system was removed is bridged to permit passage of the wheels 66 which are of singular character, to pass over the hole. The tree is then transported to the new location where a similar hole has been previously dug and this hole may be bridged to permit the fore-carriage structure to pass thereover. This bridging is then removed. When this has been effected, the fore-carriage is disconnected, the chains 79 are removed, the brace frame 49—50—51 is disconnected, and finally the auxiliary frame 41—44 is disconnected from the combination boom and bent. Then the holddown cable anchorage, which has been reassociated with clevis 26, is gradually released, permitting the tree and combination boom and bent to be tilted into position so that the root system registers with the new hole and is received thereby. Of course, during the tilting operation, either for elevating the tree out of its original hole or depositing it into its new hole, the dual wheel structure 80 is suitably blocked against all movement, so that pivotal movement only of the combination bent and boom relative the wheels 80 takes place.

After being deposited in the new hole, the various conections between the tree and the combination boom and bent are then removed. The new hole is filled and the tree guyed to hold same in place.

Following the disassociation of the tree from bent and boom structure, the latter is tilted into substantially horizontal position and approximately to 90° to tree depositing position. Then the fore-carriage is associated with the coupling 27.

One or more brace frames previously mentioned, and of different sizes, depending upon how many are carried are then suitably secured by the cable 58 or chain 57 or both to the boom structure, and then supplementary frame 41—43—44 is also suitably secured thereto, as well as the clamp structure. The brace frame and supplementary frame may lie parallel to each other and extend from member 26 toward the cradle and lie on members 36, if desired. The supplementary frame, if it is not desired to detach the same, may be swung parallel to the cradle structure and secured thereto. Thus the overall length of the device, when arranged for transportation without a tree, is only that extending from approximately the pivot 40 to the connection 64 or in other words, the length of the forecarriage and the boom. The maximum height is that of the cradle except when the supplementary frame is secured in parallelism to the cradle.

A suitable source of power is an automobile or truck which may be connected to the apertured plate 63. To permit removal of the combination boom and bent and for normal transportation of the device, the forward coupling 27 is provided. To permit proper transportation of the tree when mounted on the tree mover device, movement should be in the direction of the root system so that projecting limbs and the like, in meeting obstructions, will freely pass therethrough or along the same instead of engaging the branches or limbs and interlocking therewith. To permit this type of movement, the coupling 45 is provided.

While the invention has been described in great detail in the foregoing specifications, it is to be understood the same is illustrative and not restrictive in character. Various modifications are possible in the fabrication of the respective parts, the specific fabrication illustrated herein being merely by way of example only and the various modifications of the herein disclosed invention which readily suggest themselves to persons skilled in this art, are all considered within the broad scope of the invention, reference being had to the appended claims.

The invention claimed is:

1. A tree mover device including a wheeled frame including an axle, a boom and a bent interconnected together, the boom and bent being substantially transverse to each other, an auxiliary frame having connection to the frame at the bent end thereof and projecting therefrom opposite from the boom, a brace structure bearing at its lower end upon the auxiliary frame and upon the root system of a tree supported by the device and inclined toward the bent, the auxiliary frame having converging sides widest at the portion connected to the wheeled frame, the brace structure having converging sides, the narrowest end thereof bearing upon the narrow end of the auxiliary frame, means operatively connecting the upper end of the brace structure and axle forming a sling arrangement for the root system, and means connecting the boom to the tree trunk to prevent tilting of the latter upon the bent.

2. A tree mover device including a wheeled frame including an axle, a boom and a bent interconnected together, the boom and bent being substantially transverse to each other, an auxiliary frame having connection to the frame at the bent end thereof and projecting therefrom opposite from the boom, a brace structure bearing at its lower end upon the auxiliary frame and upon the root system of a tree supported by the device and inclined toward the bent, means operatively connecting the upper end of the brace structure and the axle forming a sling arrangement for the root system, means connecting the boom to the tree trunk to prevent tilting of the latter upon the bent, wheels at opposite ends of the axle, the bent having upwardly converging sides extending from immediately adjacent the wheels, the boom including a central member and forwardly directed converging sides extending from immediately adjacent the wheels to the forward end of the central member, brace means extending from adjacent the forward ends of the converging sides, but slightly rearwardly of the member side connection and to the upper end of the bent adjacent each side thereof and connected to both, and a box type bracing consisting of an element between the boom sides, elements between the brace means and the boom sides, and an element between the brace means, the said box type bracing being secured between the bent and the free end of the boom.

3. A tree mover device including a wheeled frame including an axle, a boom and a bent interconnected together, the boom and bent being substantially transverse to each other, an auxiliary frame having connection to the frame at the bent end thereof and projecting therefrom opposite from the boom, a brace structure bearing at its lower end upon the auxiliary frame and upon the root system of a tree supported by the device and inclined toward the bent, means operatively connecting the upper end of the brace structure and the axle forming a sling arrangement for the root system, means connecting the boom to the tree trunk to prevent tilting of the latter upon the bent, means connected at one end to the tree near the bent supported portion thereof and at the other end to the free end of the boom to prevent longitudinal movement of the tree on the bent, wheels at opposite ends of the axle, the bent having upwardly converging sides extending from immediately adjacent the wheels, the boom including a central member and forwardly directed converging sides extending from immediately adjacent the wheels, to the forward end of the central member, brace means extending from adjacent the forward ends of the converging sides but slightly rearwardly of the member-side connection and to the upper end of the bent adjacent each side thereof and connected to both, and a box type bracing consisting of an element between the boom sides, elements between the brace means and the boom sides, and an element between the brace means, the said box type bracing being secured between the bent and the free end of the boom.

4. A tree mover device including a wheeled frame including an axle, a boom and a bent interconnected together, the boom and bent being substantially transverse to each other, an auxiliary frame having connection to the frame at the bent end thereof and projecting therefrom opposite from the boom, a brace structure bearing at its lower end upon the auxiliary frame and upon the root system of a tree supported by the device and inclined toward the bent, means operatively connecting the upper end of the brace structure and the axle forming a sling arrangement for the root system, means connecting the boom to the tree trunk to prevent tilting of the latter upon the bent, wheels at opposite ends of the axle, the bent having upwardly converging sides extending from immediately adjacent the wheels, the boom including a central member and forwardly directed converging sides extending from immediately adjacent the wheels to the forward end of the central member, brace means extending from adjacent the forward ends of the converging sides but slightly rearwardly of the member-side connection and to the upper end of the bent adjacent each side thereof and connected to both, and a box type bracing consisting of an element between the boom sides, elements between the brace means and the boom sides, and an element between the brace means, the said box type bracing being secured between the bent and the free end of the boom, the auxiliary frame having converging sides and widest at the portion connected to the wheel frame and the brace structure having converging sides, the narrowest end thereof bearing upon the narrow end of the auxiliary frame.

5. A tree mover device including a wheeled frame including an axle, a boom and a bent interconnected together, the boom and bent being substantially transverse to each other, an auxiliary frame having connecton to the frame at the bent end thereof and projecting therefrom opposite from the boom, a brace structure bearing at its lower end upon the auxiliary frame and upon the root system of a tree supported by the device and inclined toward the bent, means operatively connecting the upper end of the brace structure and the axle forming a sling arrangement for the root system, means connecting the boom to the tree trunk to prevent tilting of the latter upon the bent, means connected at one end to the tree near the bent supported portion thereof and at the other end to the free end of the boom to prevent longitudinal movement of the tree on the bent, wheels at opposite ends of the axle, bent structure having upwardly converging sides extending from immediately adjacent the wheels, the boom including a central member and forwardly directed converging sides extending from immediately adjacent the wheels to the forward end of the central member, brace means extending from adjacent the forward ends of the converging sides but slightly rearwardly of the member-side connection and to the upper end of the bent adjacent each side thereof and connected to both, and a box type bracing consisting of an element between the boom sides, elements between the brace means and the boom sides, and an element between the brace means, the said box type bracing being secured between the bent and the free end of the boom, the auxiliary frame having converging sides and widest at the portion connected to the wheel frame and the brace structure having converging sides, the narrowest end thereof bearing upon the narrow end of the auxiliary frame.

HOBART H. BLOUNT.